(12) United States Patent
Miller et al.

(10) Patent No.: US 12,429,869 B2
(45) Date of Patent: Sep. 30, 2025

(54) MATERIAL HANDLING VEHICLE MODE TRANSITION SYSTEMS AND METHODS

(71) Applicant: The Raymond Corporation, Greene, NY (US)

(72) Inventors: Daniel B. Miller, Greene, NY (US); Joseph T. Yahner, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 153 days.

(21) Appl. No.: 18/504,644

(22) Filed: Nov. 8, 2023

(65) Prior Publication Data

US 2024/0152140 A1    May 9, 2024

Related U.S. Application Data

(60) Provisional application No. 63/429,911, filed on Dec. 2, 2022, provisional application No. 63/423,686, filed on Nov. 8, 2022.

(51) Int. Cl.
*B66F 9/06* (2006.01)
*G05D 1/00* (2006.01)

(52) U.S. Cl.
CPC .......... *G05D 1/0061* (2013.01); *B66F 9/063* (2013.01)

(58) Field of Classification Search
CPC ............................... G05D 1/0061; B66F 9/063
See application file for complete search history.

(56) References Cited

U.S. PATENT DOCUMENTS

| 8,577,551 | B2 | 11/2013 | Siefring et al. |
| 11,305,936 | B2 | 4/2022 | Sullivan et al. |
| 2009/0059004 | A1 | 3/2009 | Bochicchio |
| 2021/0276843 | A1 | 9/2021 | Garrison, III |
| 2021/0300742 | A1 | 9/2021 | Bistry et al. |
| 2022/0269262 | A1 | 8/2022 | Corbett et al. |

FOREIGN PATENT DOCUMENTS

| JP | 2009025984 A | 2/2009 |
| WO | 2011002478 A2 | 1/2011 |
| WO | 2019181664 A1 | 9/2019 |

OTHER PUBLICATIONS

European Patent Office, Partial Search Report, Application No. 23208438.4, Feb. 29, 2024, 13 pages.
European Patent Office, Extended Search Report, Application No. 23208438.4, Jun. 13, 2024, 12 pages.

*Primary Examiner* — Mathew Franklin Gordon
(74) *Attorney, Agent, or Firm* — Quarles & Brady LLP

(57) ABSTRACT

Systems and methods for transitioning a material handling vehicle between a manual mode and a remote mode is provided. The method includes automatically transitioning the material handling vehicle from the remote mode to the manual mode in response to a determination, by a floor mat sensor, that an operator is positioned within an operator compartment of the material handling vehicle. The vehicle is prevented from entering the remote mode while the floor mat sensor indicates that the operator is positioned within the operator compartment. A mode selection switch, positioned on the material handling vehicle, is actuated from a first position to a second position and back to the first position, permitting the vehicle to enter the remote mode after the floor mat sensor ceases to indicate that the operator is positioned within the operator compartment.

20 Claims, 8 Drawing Sheets

MATERIAL HANDLING VEHICLE MODE TRANSITION SYSTEMS AND METHODS

CROSS-REFERENCES TO RELATED APPLICATIONS

This application claims the benefit of U.S. Provisional Patent Application No. 63/429,911 filed Dec. 2, 2022, and U.S. Provisional Patent Application No. 63/423,686 filed Nov. 8, 2022, each of which are herein incorporated by reference in their entirety.

BACKGROUND

Warehouses typically employ the use of material handling vehicles, specifically, operators may use a remote control device to control travel of a material handling vehicle within the warehouse.

In addition, for certain types of vehicles there are training requirements imposed by various government agencies, laws, rules, and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The present disclosure relates generally to material handling vehicles and, more specifically, to remotely controllable material handling vehicles that can be switched between a manual mode and a remote mode.

In one aspect, the present disclosure describes a method of transitioning a material handling vehicle between a manual mode and a remote mode. The method includes automatically transitioning the material handling vehicle from the remote mode to the manual mode in response to a determination, by a floor mat sensor, that an operator is positioned within an operator compartment of the material handling vehicle, preventing entering the remote mode while the floor mat sensor indicates that the operator is positioned within the operator compartment, manually actuating a mode selection switch, positioned on the material handling vehicle, from a first position to a second position and back to the first position, and permitting entering the remote mode after the floor mat sensor ceases to indicate that the operator is positioned within the operator compartment.

In another aspect, the present disclosure describes a system for transitioning a material handling vehicle between a manual mode and a remote mote. The system includes one or more mode selection switches configured to transition the material handling vehicle from the manual mode to the remote mode, a floor mat sensor positioned within an operator compartment of the material handling vehicle, the floor mat sensor configured to provide a signal to the material handling vehicle to exit the remote mode and enter the manual mode when the floor mat sensor determines an operator is within the operator compartment while the material handling vehicle is in the remote mode, and a display positioned within the operator compartment of the material handling vehicle, the display configured to depict a status message when the floor mat sensor provides a signal to the material handling vehicle when the floor mat sensor determines the operator is within the operator compartment while the material handling vehicle is in the remote mode. In one example, actuation of the one or more mode selection switches from a first position to a second position and back to the first position clears the status message from the display and permit the material handling vehicle to enter the remote mode.

In another aspect, the present disclosure describes a method of transitioning a material handling vehicle between a manual mode and a remote mode. The method includes operating the material handing vehicle in the remote mode in response to a travel request from a remote control device in communication with the material handling vehicle. The method further includes automatically transitioning the material handling vehicle from the remote mode to the manual mode in response to a determination that a floor mat circuit of the material handling vehicle has transitioned from one state to another state, displaying a status message on a display of the material handling vehicle, clearing the status message from the display by actuation of one or more mode selection switches, and upon the determination that the status message is cleared, the material handling vehicle reentering the remote mode.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The present disclosure will be better understood and features, aspects, and advantages other than those set forth above will become apparent when consideration is given to the following detailed description thereof. Such detailed description makes reference to the following drawings.

DETAILED DESCRIPTION

Figure 1:
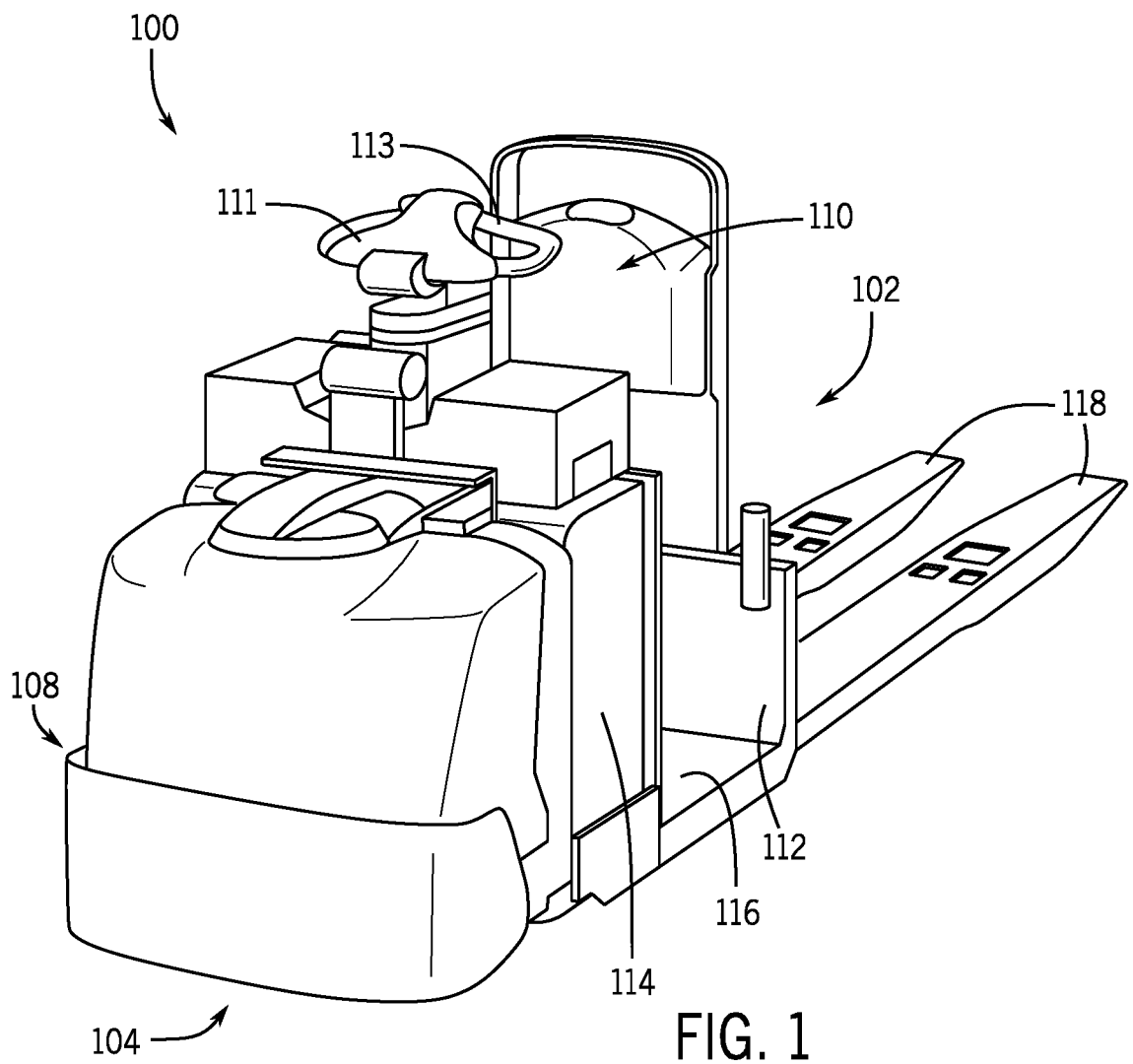
FIG. 1 is a perspective view of a non-limiting example of a material handling vehicle according to aspects of the present disclosure.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the various system and methods disclosed herein are suitable for other vehicles, such as automobiles, busses, trains, tractor-trailers, farm vehicles, factory vehicles, and the like.

It should be noted that the various material handling vehicles listed above may perform a variety of load handling operations. For example, the material handling vehicle may operate the material handling vehicle and/or the load handling portion (e.g., forks, mast, and/or fork carriage, etc.) of the material handling vehicle to traverse (e.g., move the forks up to a full load depth), tilt, reach (e.g., move the forks up to a partial load depth), rotate, drive (e.g., move the material handling vehicle), travel (e.g., move the material handling vehicle), and/or any combination thereof to complete a load handling operation.

Figure 2:
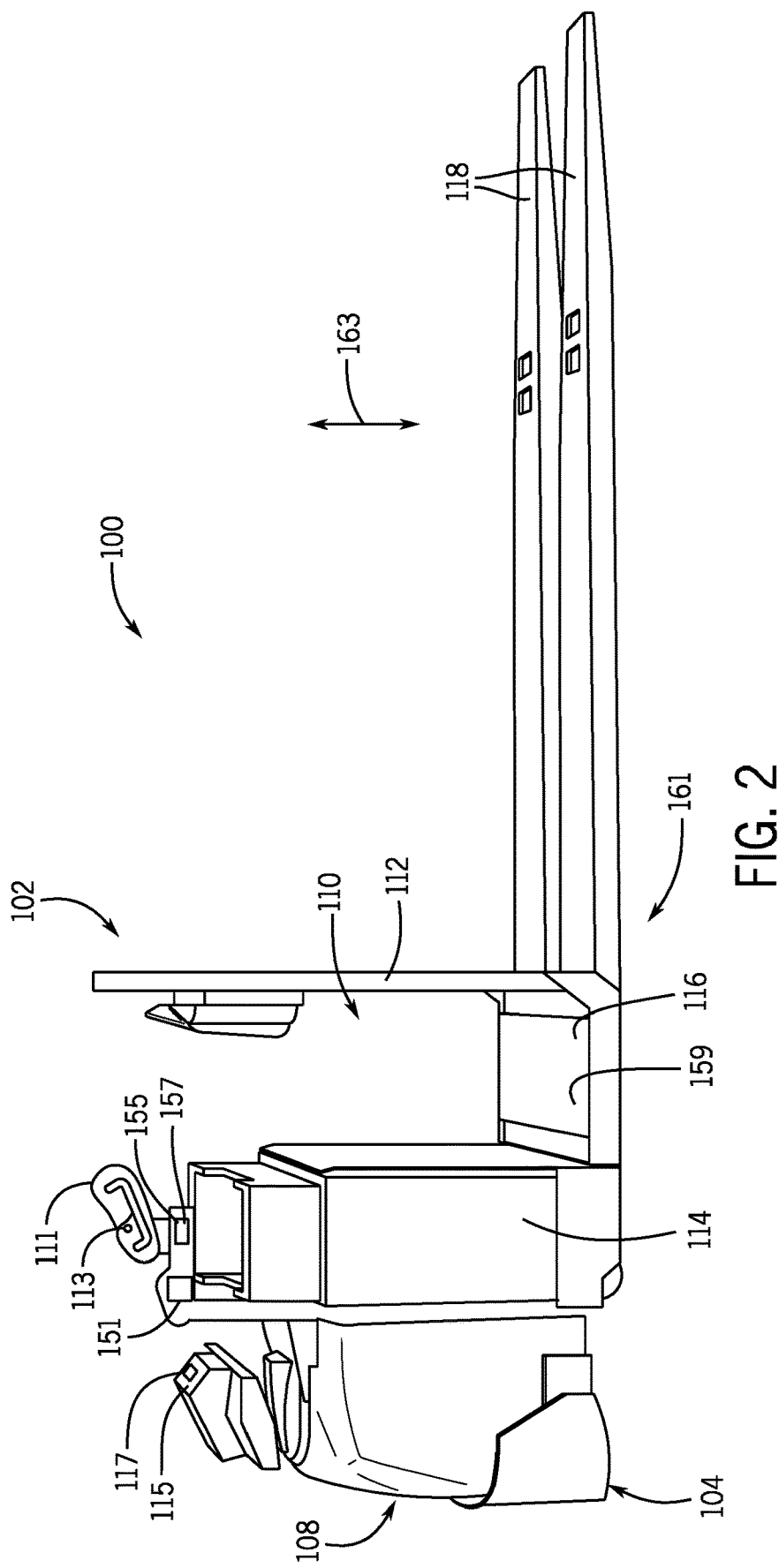
FIG. 2 is a side view of the material handling vehicle of FIG. 1.

FIGS. 1 and 2 illustrate one non-limiting example of a material handling vehicle 100 according to the present disclosure. The material handling vehicle 100 may include a vehicle frame 102, a traction wheel 104, a power section 108, and an operator compartment 110. The power section 108 may be disposed within the vehicle frame 102 and may include a battery to supply power to various components of the material handling vehicle 100. For example, the battery may supply power to a motor and/or transmission disposed within the power section 108 and configured to drive the traction wheel 104. In the illustrated non-limiting example, the traction wheel 104 is arranged under the power section 108. In other non-limiting examples, the traction wheel 104 may be arranged in another location under the vehicle frame 102.

The operator compartment 110 may include a control handle 111 configured to provide a user interface for an operator and to allow the operator to control a speed and direction of travel of the material handling vehicle 100. In some non-limiting examples, the control handle 111 may be configured to manually steer and control power to the traction wheel 104. The control handle 111 can include a control handle switch 155, which can be used to determine if the control handle is in the down (e.g., operating) position, or if the control handle is in the upright (e.g., brake) position. In some embodiments, the control handle 111 can be a spring-loaded 157 control handle 111 and can be configured to default to a single position. For example, the control handle 111 can default into either the down (e.g., operating) position, as shown, or the upright (e.g., brake) position. In other embodiments, the spring loaded control handle 111 can be configured to default to more than one position. For example, the spring-loaded control handle can default to the position the spring-loaded control handle is closest to when released by an operator. In one particular example, the spring-loaded control handle is closest to the down position when released by the operator, so the spring-loaded control handle moves to the substantially down position due to the spring force. Correspondingly, when the spring-loaded control handle is closest to the upright position when released by the operator, the spring-loaded control handle moves to the substantially upright position due to the spring force. Other arrangements are also possible.

In the illustrated non-limiting example shown in FIGS. 1 and 2, the material handling vehicle 100 includes the operator compartment 110 arranged rearward of the power section 108 and having an operator opening 112 that opens towards lateral sides 114 of the material handling vehicle 100. The operator compartment 110 may also contain a floor mat 116 on which an operator of the material handling vehicle 100 may stand. The floor mat 116 can also include a floor mat sensor 159, which can be used to determine when the material handling vehicle operator is in the operator compartment and positioned on the floor mat. The floor mat sensor 159 can be of known types including proximity, pressure, or weight, as non-limiting examples. In some non-limiting examples, the material handling vehicle 100 may be designed with the operator compartment arranged differently, for example, with an operator opening 112 that opens rearwardly. In the illustrated non-limiting example, the material handling vehicle 100 includes a pair of forks 118 that can be raised or lowered by actuators 161, e.g., as shown by arrow 163, in response to commands from the control handle 111.

Figure 3:
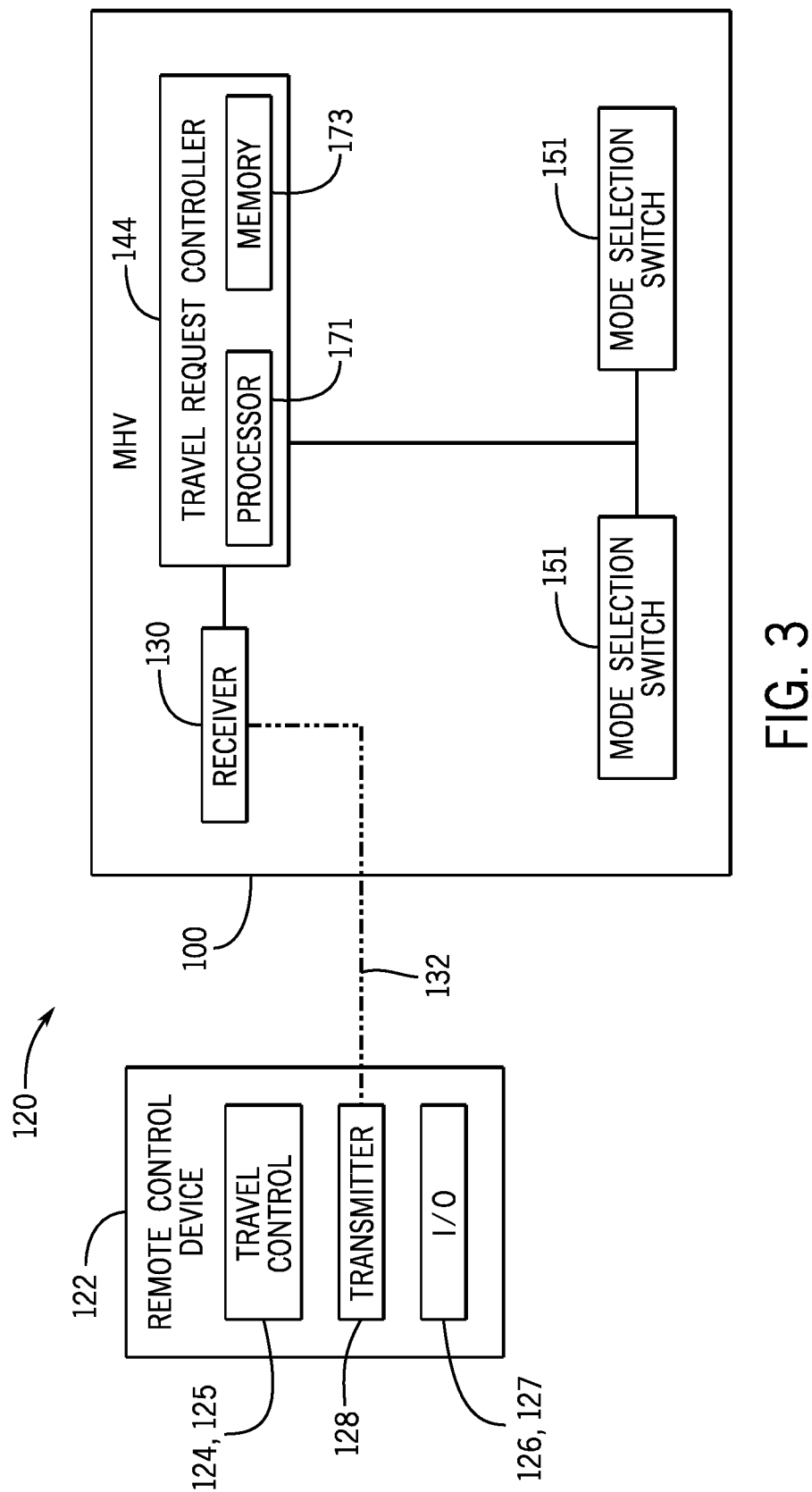
FIG. 3 is a diagrammatic view of a system for remotely controlling the material handling vehicle of FIG. 1.

FIG. 3 illustrates one non-limiting example of a remote control system 120 for a remotely controllable material handling vehicle, which may be implemented, for example, in the material handling vehicle 100 shown in FIG. 1. The remote control system 120 can be a modular system in that at least some of the elements that support the remote control function can be housed together in one or more housings that can be used to retrofit a material handling vehicle to allow the vehicle to operate in a remote control mode. The remote control system 120 includes a remote control device 122 in communication with the material handling vehicle 100. The remote control device 122 is operable by an operator of the material handling vehicle 100 and can include a travel control function 124 and an I/O function 126. The travel control function 124 and the I/O function 126 can be configured as first and second manually operable functions that can be operated by, for example, a button or a switch located on the remote control device 122. For example, the travel control function 124 can be operated by a first button 125 on the remote control device 122 and the I/O function 126 can be operated by a second button 127 on the remote control device 122. The travel control function 124 and the I/O function 126 can be in electrical communication with a transmitter 128 within the remote control device 122. The transmitter 128 on the remote control device 122 can wirelessly communicate with the material handling vehicle 100 by a receiver 130 located on the material handling vehicle 100, as represented by dashed line 132. In another example, the transmitter 128 and the receiver 130 may instead each be in the form of transceivers. In some non-limiting examples, the remote control device 122 may turn off after several minutes of inactivity.

It is to be appreciated that the travel control function 124, the I/O function 126, and other material handling vehicle functions, can also be activated using other systems. For example, the functions can be voice activated, gesture activated, floor/surface illumination system activated, and/or warehouse management system activated.

Referring now to FIGS. 1-3, the material handling vehicle 100 can be configured to transition between a manual mode and a remote mode. In one non-limiting example, the material handling vehicle 100 can have one or more mode selection switches, which can include buttons or devices 151 (e.g., a manually operable multi-position switch or button, such as a rocker switch, toggle, momentary contact, push-pull, keyed, illuminated, etc.) that can be positioned within or near the operator compartment 110 for access by the operator of the material handling vehicle 100. The mode selection switches 151 may be used by an operator as a component of a mode selection process (e.g., a transition from manual mode to remote mode) of the material handling vehicle 100. For example, the mode selection switches 151 may be turned, actuated, moved, depressed, etc. to select a remote mode or a manual mode for the material handling vehicle 100. The mode selection switches 151 can be operable from a first position to a second position, and then back to the first position.

It is to be appreciated the switch or switches can be of any known type that are capable of changing from one state to another state, such as between at least one open position and one closed position, or a high state to a low state, as non-limiting examples. In other embodiments, the switch or switches may not transition between an open and closed position, and instead may be activated to change a state from one state to another state by proximity, pressure, and/or temperature, as non-limiting examples. For example, the mode selection switches 151 can be positioned on the control handle 111, next to a display 115, or on a control panel 117 and accessible by the operator. In another non-limiting example, the mode selection switches 151 can be positioned on the outside of the material handling vehicle 100. For example, the switches can be positioned on one or both of the lateral sides 114 or on the vehicle frame 102 of the material handling vehicle 100.

In another non-limiting example, the transition between a manual mode and a remote mode can be initiated by a travel request controller 144 upon a pairing of the remote control device 122 to the material handling vehicle 100, or upon activating the travel control function 124. In one non-limiting example, the travel request controller 144 may include a processor 171 configured to execute instructions stored on non-volatile memory 173. In one example, the processor may be configured to automatically transition the material handling vehicle from the remote mode into the manual mode in response to an indication that an operator is present within the operator compartment.

When the material handling vehicle 100 is in the manual mode, the material handling vehicle 100 can be operated normally by the operator. For example, the operator can use the control handle 111 on the material handling vehicle 100 to accelerate, decelerate, steer, or otherwise maneuver the material handling vehicle 100 manually by using a throttle or brake button/lever located on the control handle 111. In one non-limiting example, the control handle 111 may include one or more jog buttons 113 configured to, when engaged, cause the material handling vehicle 100 to travel at a walking speed. Upon release of the jog button 113, the material handling vehicle 100 may coast to a stop.

Figure 4:
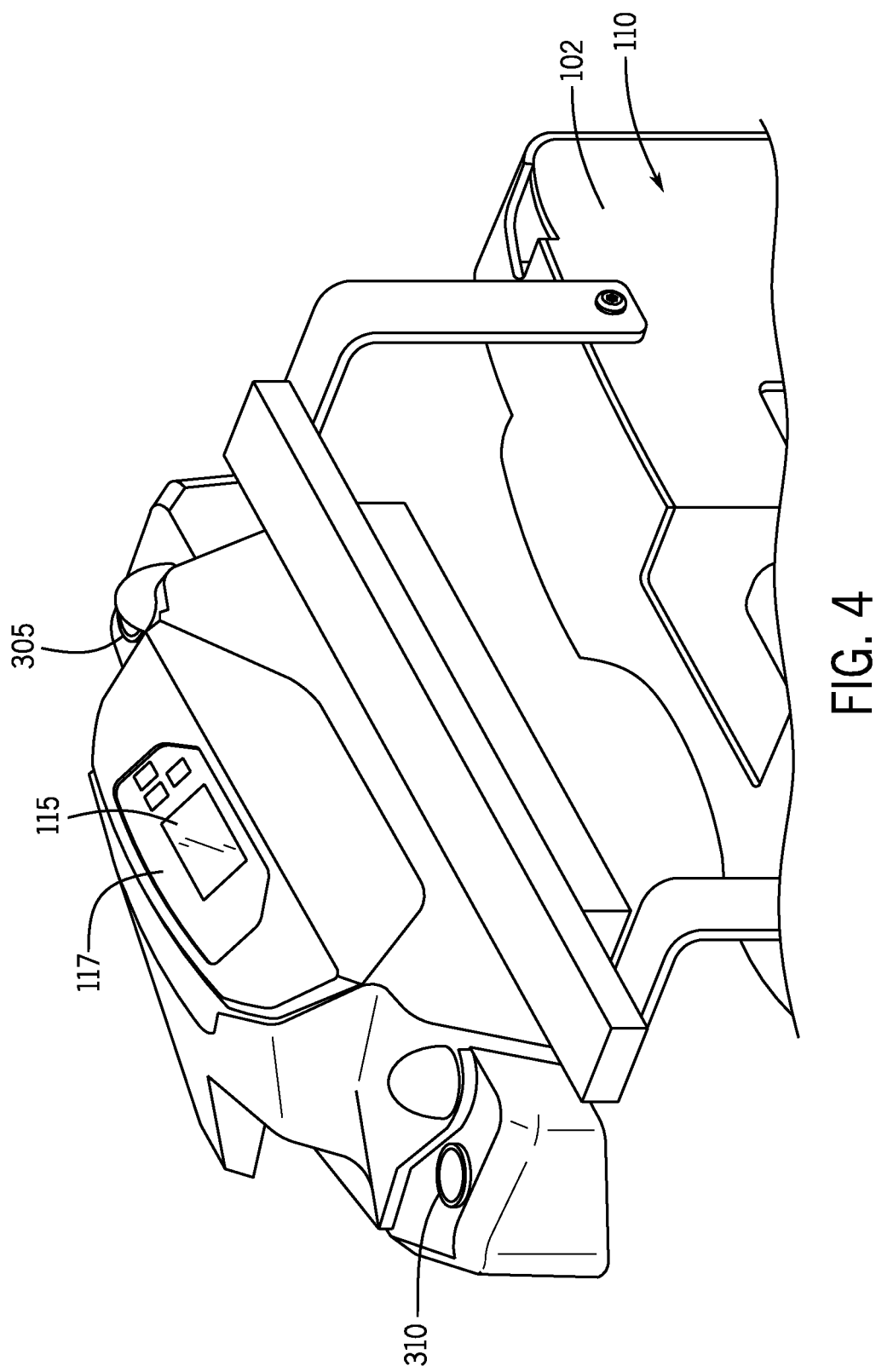
FIG. 4 is perspective view of an example arrangement of one or more mode selection switches of FIG. 3 for use with the material handling vehicle of FIG. 1.
Figure 5:
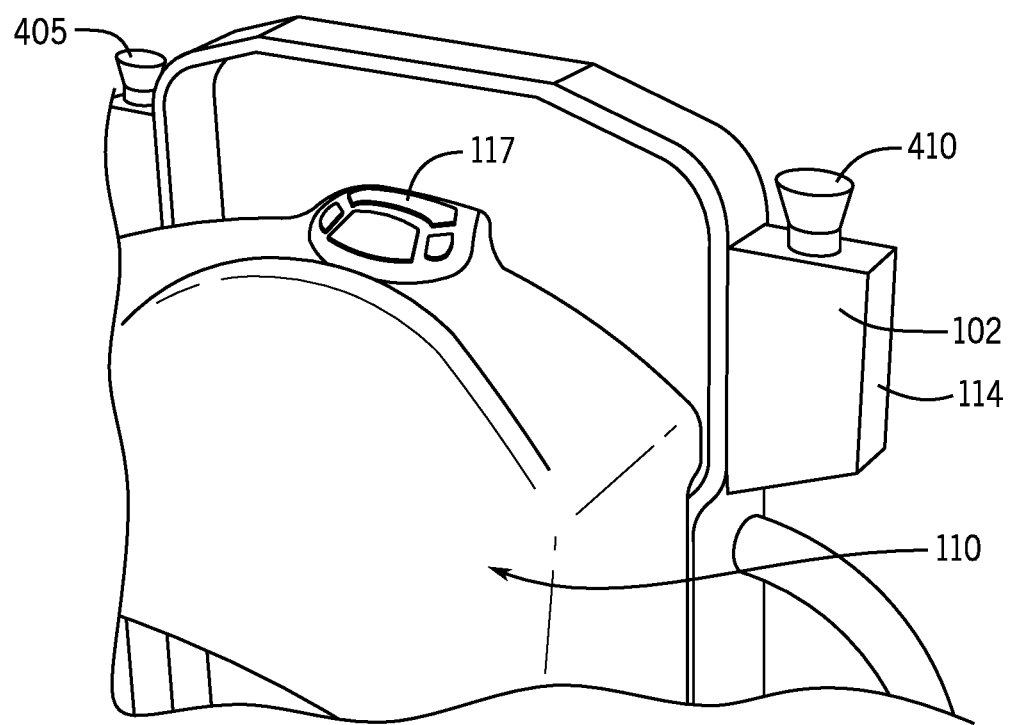
FIG. 5 is perspective view of another example arrangement of the one or more mode selection switches of FIG. 3 for use with the material handling vehicle of FIG. 1.
Figure 6:
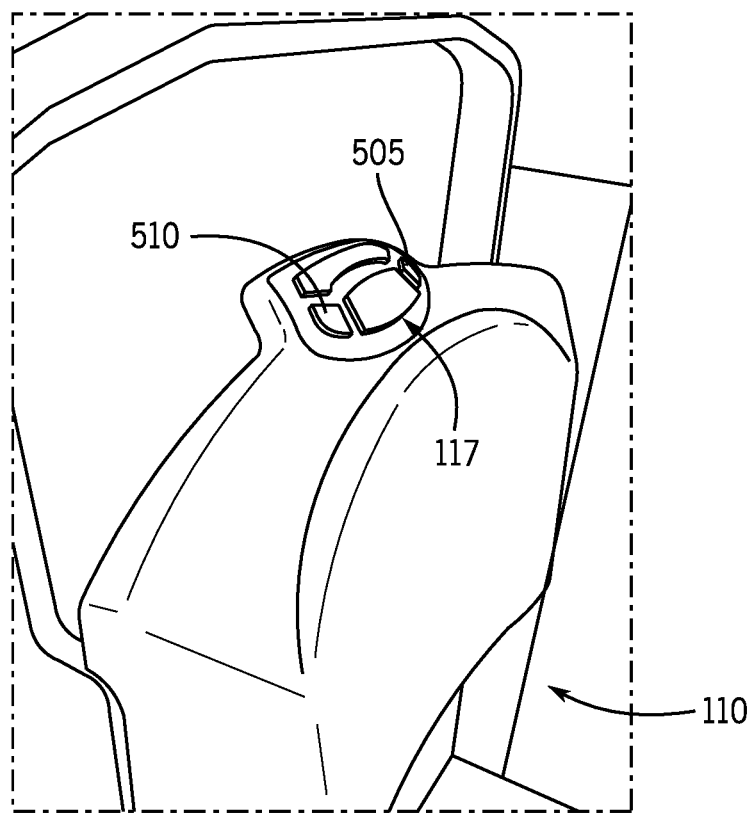
FIG. 6 is perspective view of another example arrangement of the one or more mode selection switches of FIG. 3 for use with the material handling vehicle of FIG. 1.
Figure 7:
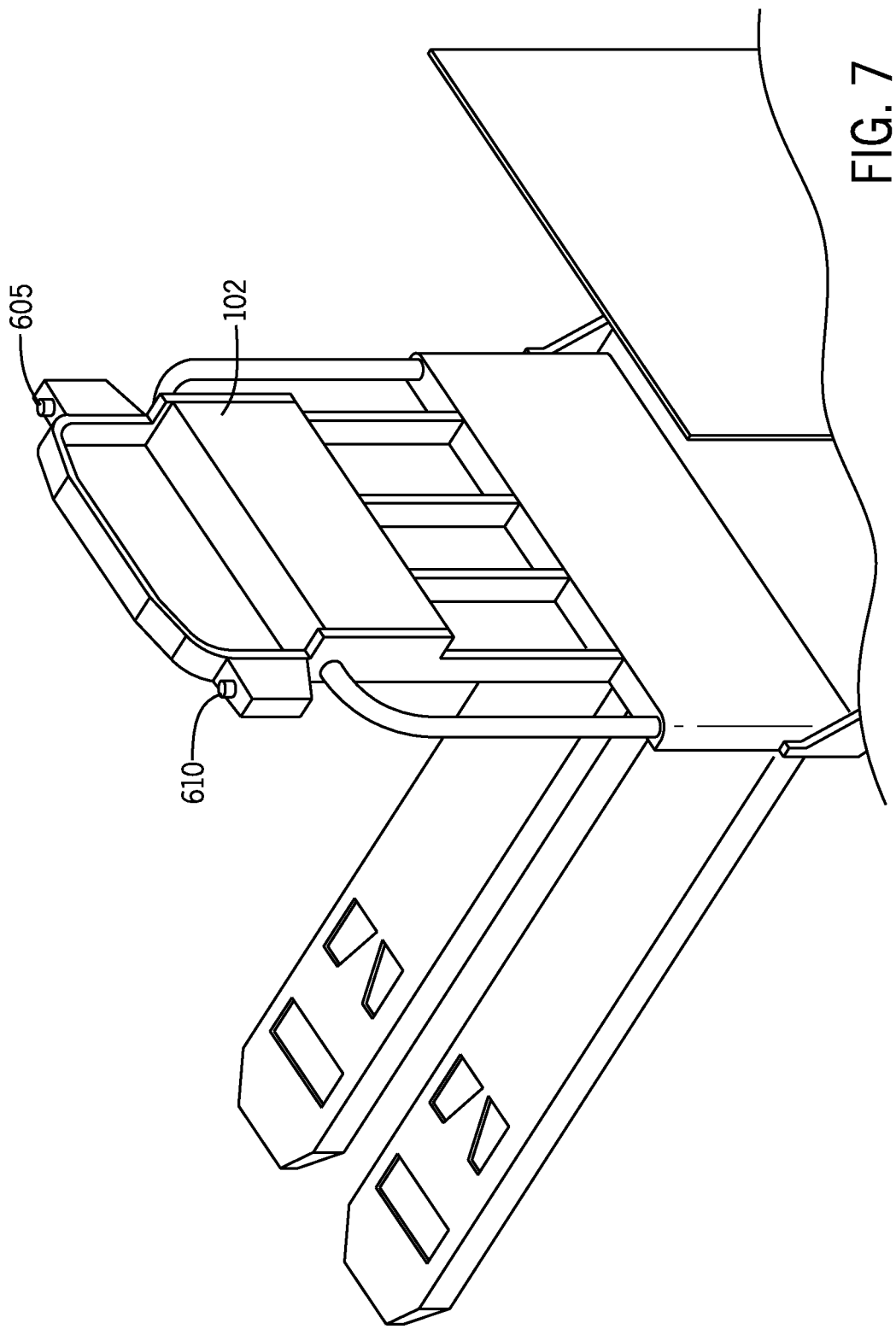
FIG. 7 is perspective view of another example arrangement of the one or more mode selection switches of FIG. 3 for use with the material handling vehicle of FIG. 1.

Looking to FIGS. 4-7, various example arrangements of the mode selection switches 151 are shown. As should be appreciated, these example arrangements are merely non-limiting examples and other arrangements of the mode selection switches 151 are envisioned. As shown in FIG. 4, the mode selection switches 151 may include a first switch 305 and a second switch 310, which may be arranged on opposing sides of the control panel 117, within the operator compartment 110. As shown in FIG. 5, the mode selection switches 151 may include a first switch 405 and a second switch 410, which may be arranged on opposing sides 114 of the material handling vehicle 100. For example, the switches 405, 410 may be arranged on the frame 102 of the material handling vehicle 100 adjacent to the control panel 117 within the operator compartment 110. As shown in FIG. 6, the mode selection switches 151 may include a first switch 505 and a second switch 510, which may be arranged on the control panel 117 within the operator compartment 110. Looking now to FIG. 7, the mode selection switches 151 may include a first switch 605 and a second switch 610, which may be arranged on the frame 102 of the material handling vehicle 100 outside or remote from the operator compartment 110.

Thus, the mode selection switches 151 may be positioned anywhere on the material handling vehicle 100 that is convenient for an operator to reach, access, or actuate the switches 151. In some cases, only a single mode selection switch 151 may be used. In other cases, three or more mode selection switches 151 may be used and arranged around the material handling vehicle 100. As should be appreciated, the first switch 305, 405, 505, 605 and the second switch 310, 410, 510, 610 may be the same or similar in design, but merely arranged in different areas of the vehicle to facilitate ease of use or operation by the operator.

Figure 8:
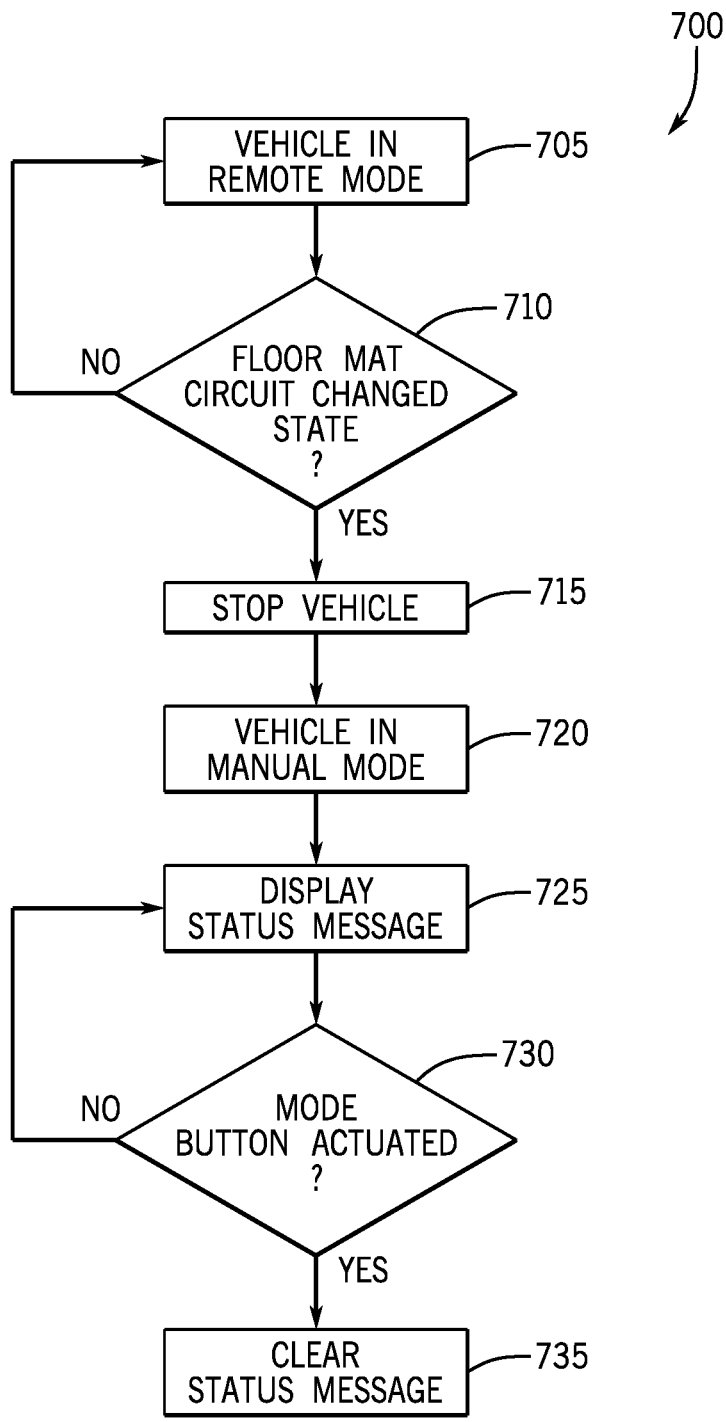
FIG. 8 is a flow chart illustrating a mode transition process for the material handling vehicle of FIG. 1.

FIG. 8 shows a flowchart depicting a mode transition process 700 for the material handling vehicle 100. In particular, the process 700 shows an example of automatically transitioning the material handling vehicle 100 from the remote mode into the manual mode when the floor mat circuit has changed state (i.e., an operator is in the operator compartment). For example, when the material handling vehicle 100 is operating in the remote mode and an operator steps into the operator compartment, the floor mat circuit closes. It should be noted that the material handling vehicle 100 operates in the remote mode without monitoring a status of the floor mat circuit. Instead, the vehicle receives an input from the floor mat circuit only when an operator is within the operator compartment such that the floor mat circuit changes state (e.g., open to closed). When an operator is not within the operator compartment (i.e., the floor mat circuit remains open), the material handling vehicle 100 can operate in the remote mode.

Looking to the mode transition process 700, at stage 705, the material handling vehicle 100 is operating in the remote mode (e.g., a mode selection switch 151 has been actuated to indicate operation in the remote mode, and no operator is in the operator compartment 110). At stage 710, the floor mat circuit closes due to an operator stepping into the operator compartment 110, which causes the material handling vehicle 100 to automatically stop travel (if moving) at stage 715. Additionally, at stage 720, the material handling vehicle 100 automatically exits the remote mode and enters the manual mode of operation (even though a mode selection switch 151 has not been actuated).

At stage 725, the display 115 of the material handling vehicle 100 will depict a status message indicting that the remote mode was interrupted due to the detection of an operator in the operator compartment 110. The material handling vehicle 100 will continue to depict the status message on the display 115 and will not return or reenter the remote mode until, at stage 730, the mode selection switch 151 is actuated (e.g., toggled, pushed, switched, etc.). Once the mode selection switch 151 has been actuated at stage 730, the status message is cleared as shown at stage 735, which then enables an operator to restart or reengage the remote mode, if desired.

Figure 9:
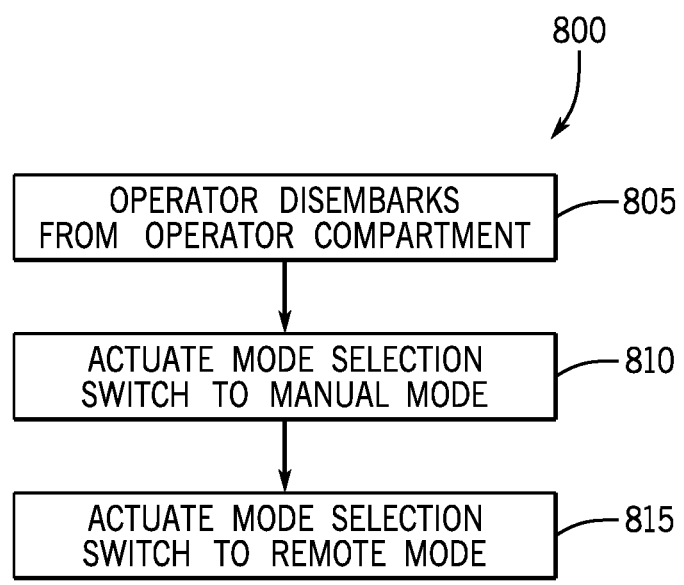
FIG. 9 is a flow chart illustrating a remote mode reengagement process for the material handling vehicle of FIG. 1.

An example process for the material handling vehicle 100 to reenter the remote mode is shown in FIG. 9. As shown, to enable the material handling vehicle 100 to reenter the remote mode, the operator must disembark from the operator compartment 110 at stage 805. Put differently, the material handling vehicle 100 must no longer be receiving a signal that the floor mat switch is closed. Following this, at stage 810, the operator actuates the mode selection switch 151 to clear the status message on the display 115. However, in some embodiments, the mode selection switch may not need to be returned to a specific position (e.g., with a momentary contact push button). Following this, at stage 815, the operator may again actuate the mode selection switch 151 to allow the material handling vehicle 100 to reenter the remote mode and restart remote operator of the material handling vehicle 100. In some embodiments, the status of the control handle switch 155 can be used in place of the floor mat switch to allow or not allow transition between the manual mode and the remote mode.

The below example use cases depict examples of the mode transition process 700 and the remote mode reengagement process 800 in use. As should be appreciated, alternative or additional example use cases are envisioned.

Example Use Case 1—The operator boards a stationary vehicle that is in the remote mode.

Upon determining that the floor mat circuit has changed state (i.e., the operator, pedestrian, or other person/object is in the operator compartment 110), the material handling vehicle 100 exits the remote mode (i.e., enters the manual mode), and displays a status message on the module display 115.

To reenter the remote mode, the mode selection switch 151 is actuated, e.g., moved to the "Manual Mode" position, and then returned to the "Remote Mode" position, with all other criteria to enter the remote mode also being satisfied.

Example Use Case 2—The operator boards a moving vehicle that is in the remote mode.

Upon determining that the floor mat circuit has changed state (i.e., the operator, pedestrian, or other person/object is in the operator compartment 110), the material handling vehicle 100 stops, exits the remote mode (i.e., enters the manual mode), and displays a status message on the module display 115.

To reenter the remote mode, the mode selection switch 151 is actuated, e.g., moved to the "Manual Mode" position, and then returned to the "Remote Mode" position, with all other criteria to enter the remote mode also being satisfied.

Example Use Case 3—The operator attempts to enter the remote mode while on the vehicle.

Upon determining that all criteria are met to enter the remote mode, the material handling vehicle 100 enters the remote mode, and immediately determines that the floor mat circuit is closed (i.e., the operator, pedestrian, or other person/object is in the operator compartment 110), the material handling vehicle 100 exits the remote mode (i.e., enters the manual mode), and displays a status message on the module display 115.

To reenter the remote mode, the mode selection switch 151 is actuated, e.g., moved to the "Manual Mode" position, and then returned to the "Remote Mode" position, with all other criteria to enter the remote mode also being satisfied.

Example Use Case 4—The operator disembarks from a vehicle that is in the remote mode.

An operator will be unable to be on the material handling vehicle that is in the remote mode as described previously. If an operator is on the material handling vehicle 100 (i.e., in the operator compartment 110), the material handling vehicle 100 exits the remote mode and enters the manual mode.

Example Use Case 5—The operator disembarks from a vehicle in the manual mode immediately after all criteria are met to enter the remote mode.

Upon determining that all criteria are met to enter the remote mode, if the floor mat circuit is still closed (i.e., the operator, pedestrian, or other person/object is in the operator compartment 110), the vehicle exits the remote mode (i.e., enters the manual mode), and displays a status message on the module display 115.

To reenter the remote mode, the mode selection switch 151 is actuated, e.g., moved to the "Manual Mode" position, and then returned to the "Remote Mode" position, with all other criteria to enter the remote mode also being satisfied.

Example Use Case 6—The operator disembarks from a vehicle in the manual mode immediately prior to all criteria being met to enter the remote mode.

Should the operator disembark from the material handling vehicle 100 prior to the remote control system 120 determining that all criteria are met to enter the remote mode, the vehicle will enter the remote mode with an actuation of the mode selection switch 151 and permit remote operation of the material handling vehicle 100 using the remote control device 122.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

As should be noted, for certain types of vehicles there are training requirements imposed by various government agencies, laws, rules, and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Within this specification embodiments have been described in a way which enables a clear and concise specification to be written, but it is intended and will be appreciated that embodiments may be variously combined or separated without parting from the disclosed technology. For example, it will be appreciated that all features described herein are applicable to all aspects of the disclosed technology described herein.

Thus, while the disclosed technology has been described in connection with particular embodiments and examples, the disclosed technology is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the disclosed technology are set forth in the following claims.

The invention claimed is:

1. A method of transitioning a material handling vehicle between a manual mode and a remote mode, comprising:
   automatically transitioning the material handling vehicle from the remote mode to the manual mode in response to a determination, by a floor mat sensor, that an operator is positioned within an operator compartment of the material handling vehicle;
   preventing entering the remote mode while the floor mat sensor indicates that the operator is positioned within the operator compartment;
   manually actuating a mode selection switch, positioned on the material handling vehicle, from a first position to a second position and back to the first position; and
   permitting entering the remote mode after the floor mat sensor ceases to indicate that the operator is positioned within the operator compartment.

2. The method of claim 1, wherein the first position of the mode selection switch corresponds to the remote mode.

3. The method of claim 2, wherein the second position of the mode selection switch corresponds to the manual mode.

4. The method of claim 1, wherein transitioning the material handling vehicle from the remote mode to the manual mode automatically stops travel of the material handling vehicle.

5. The method of claim 1, further comprising:
   generating a status message in response to the determination, by the floor mat sensor, that the operator is positioned within the operator compartment of the material handling vehicle;
   wherein the status message is depicted on a display positioned within the operator compartment.

6. The method of claim 5, further comprising:
   preventing entering the remote mode while the status message is depicted on the display.

7. The method of claim 6, further comprising:
   clearing the status message from the display by manually actuating the mode selection switch from the first position to the second position and back to the first position.

8. The method of claim 7, wherein, when the floor mat sensor ceases to indicate that the operator is positioned within the operator compartment and the status message is cleared from the display, the material handling vehicle is configured to reenter the remote mode.

9. A system for transitioning a material handling vehicle between a manual mode and a remote mote, comprising:
   one or more mode selection switches configured to transition the material handling vehicle from the manual mode to the remote mode;
   a floor mat sensor positioned within an operator compartment of the material handling vehicle, the floor mat sensor configured to provide a signal to the material handling vehicle to exit the remote mode and enter the manual mode when the floor mat sensor determines an operator is within the operator compartment while the material handling vehicle is in the remote mode; and
   a display positioned within the operator compartment of the material handling vehicle, the display configured to depict a status message when the floor mat sensor provides a signal to the material handling vehicle when the floor mat sensor determines the operator is within the operator compartment while the material handling vehicle is in the remote mode;
   wherein actuation of the one or more mode selection switches from a first position to a second position and back to the first position is configured to clear the status message from the display and permit the material handling vehicle to enter the remote mode.

10. The system of claim 9, wherein the first position of the one or more mode selection switches corresponds to the remote mode.

11. The system of claim 10, wherein the second position of the one or more mode selection switches corresponds to the manual mode.

12. The system of claim 9, wherein the one or more mode selection switches includes a first mode selection switch and a second mode selection switch.

13. The system of claim 12, wherein the first mode selection switch and the second mode selection switch are positioned on opposing sides of the operator compartment of the material handling vehicle.

14. The system of claim 9, wherein the remote mode is unavailable when the floor mat sensor determines that the operator is within the operator compartment.

15. The system of claim 12, wherein the first mode selection switch and the second mode selection switch are positioned outside of the operator compartment of the material handling vehicle.

16. A method of transitioning a material handling vehicle between a manual mode and a remote mode, comprising:
   operating the material handling vehicle in the remote mode in response to a travel request from a remote control device in communication with the material handling vehicle;
   automatically transitioning the material handling vehicle from the remote mode to the manual mode in response to a determination that a floor mat circuit of the material handling vehicle has transitioned from one state to another state;
   displaying a status message on a display of the material handling vehicle;
   clearing the status message from the display by actuation of one or more mode selection switches; and
   upon the determination that the status message is cleared, the material handling vehicle reentering the remote mode.

17. The method of claim 16, wherein the one or more mode selection switches includes a first mode selection switch and a second mode selection switch.

18. The method of claim 17, wherein the first mode selection switch and the second mode selection switch are positioned on opposing sides of an operator compartment of the material handling vehicle.

19. The method of claim 16, wherein clearing the status message from the display further comprises:
   actuating one of the one or more mode selection switches from a first position to a second position; and
   actuating the one of the one or more mode selection switches from the second position back to the first position.

20. The method of claim 18, wherein the floor mat circuit is positioned within the operator compartment of the material handling vehicle.

* * * * *